Figure 1:
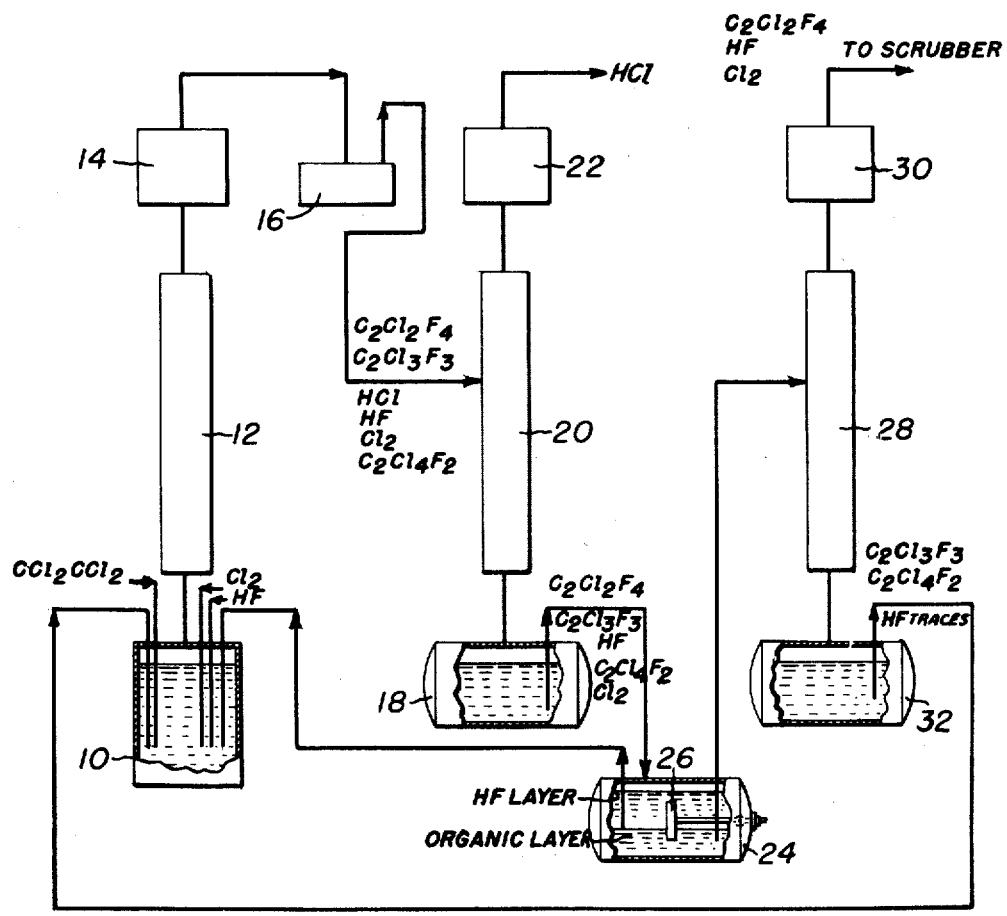

INVENTOR.
Anthony F. Benning

Patented Aug. 9, 1949

2,478,362

UNITED STATES PATENT OFFICE 2,478,362

DISTILLATION PROCESS FOR SEPARATING PRODUCTS OF PERCHLORO-ETHYLENE FLUORINATION

Anthony F. Benning, Woodstown, N. J., assignor to Kinetic Chemicals, Inc., Wilmington, Del., a corporation of Delaware Application June 15, 1948, Serial No. 33,024

6 Claims. (Cl. 202—51)

This invention relates to a process for separating valuable components from reaction mixtures obtained in the fluorination of perchloro-ethylene.

In the fluorination of perchloro-ethylene in the presence of an antimony catalyst as usually carried out heretofore, there has been produced a reaction mixture comprising mainly HCl, HF, $C_2Cl_2F_4$ and $C_2Cl_3F_3$, usually with small proportions of $Cl_2$ and $C_2Cl_4F_2$. The separation of the valuable components of such mixture has been attended with considerable difficulty. The usual procedure has been to wash the reaction mixture with water and with caustic soda solution to remove the acidic components and free chlorine, drying and condensing the washed products and then subjecting to fractional distillation to remove the dichlorotetrafluoroethane. During the reaction, only about 50% to 75% of the $CCl_2CCl_2$ is converted to $C_2Cl_2F_4$ so that the reaction mixture contains about 44 mole per cent of HCl, about 6 mole per cent of $C_2Cl_2F_4$, about 6 mole per cent of $C_2Cl_3F_3$, about 44 mole per cent of HF and smaller amounts of $Cl_2$ and $C_2Cl_4F_2$. This requires the use of large size equipment to wash, dry and condense the large amounts of $C_2Cl_3F_3$ and other organic products in the reaction mixture. Also, substantial amounts of valuable organic products are lost by solution in the wash water. This procedure further involves the loss of valuable HCl and HF in the form of an aqueous solution contaminated with organic products. Furthermore, when it was attempted to fractionally distill the reaction mixture, it was found that the distillation characteristics of the various components varied so much and were so inconsistent that, prior to my invention, it was not possible to carry out an efficient and economic separation, the HF, particularly, distilling with all organic fractions.

More recently, the fluorination procedure has been improved so as to more precisely control the number and character of the organic products in the off gases, even to the extent of obtaining substantially only one particularly desired fluorinated product. Briefly, such control is obtained by so regulating the pressures and temperatures, in the reaction vessel and in the reflux column above the reaction vessel, that only the desired organic product, or desired mixture of organic products, is refluxed in the upper portion of the reflux column, the next less highly fluorinated product is refluxed in the lower portion of the reflux column, and a considerable amount of organic materials are maintained in the reaction vessel. The organic materials in the reaction vessel are miscible with the catalyst and are usually maintained in such a proportion as to provide a solution containing from about 50% to about 80% by weight of catalyst. The organic materials in the reaction vessel are a refluxing mixture of under-fluorinated products and a minimum of the desired product or products. By this procedure, over-fluorination is virtually eliminated and all under-fluorinated products and chlorine are eliminated from the off gases from the reflux column.

As a result of such improved procedure, an equilibrium system is set up whereby the composition of the organic products in the off gases may be readily controlled by varying the temperatures and pressures. This system has been operated at pressures of from about 10 to about 450 pounds per square inch gauge and catalyst temperatures of from about 100° C. to about 170° C., to produce organic products in the off gases having the following compositions:

1. $CCl_2F\text{-}CCl_2F$ containing about 1% of $CCl_2F\text{-}CClF_2$ and less than 0.1% of $C_2ClF_5$, 2. $CCl_2F\text{-}CClF_2$ containing less than 0.1% of each of $CClF_2\text{-}CClF_2$ and $CCl_2F\text{-}CCl_2F$, 3. Mixtures of $C_2Cl_5F$ and $CCl_2F\text{-}CCl_2F$ containing about 1% of $CCl_2F\text{-}CClF_2$ and in which the $C_2Cl_5F$ was varied at will from about 0.1% to about 40% of the mixture, 4. Mixtures of $CCl_2F\text{-}CCl_2F$ and $CCl_2F\text{-}CClF_2$ with the proportions of each varied at will between that of 1 and that of 2 above, 5. Mixtures of $CCl_2F\text{-}CClF_2$ and $CClF_2\text{-}CClF_2$ in which the $CClF_2\text{-}CClF_2$ was varied at will from about 0.1% to about 100% of the mixture.

The above described procedures may be further modified by separating and subjecting any under-fluorinated product to a separate fluorination, instead of recycling it. Also, it is sometimes more economical and practical to so operate the modified procedure as to obtain only a fluorinated product, such as $CCl_2F\text{-}CClF_2$, which is less highly fluorinated than the desired final product, separate it from the off gases, and then subject it to a further separate fluorination to obtain the more highly fluorinated desired final product, such as $CClF_2\text{-}CClF_2$.

In all of the improved and modified fluorination procedures, the fluorinated organic products are obtained in admixture with large amounts of HCl and HF. Such mixtures present problems, in the separation of the organic products therefrom, similar to the mixtures obtained in the first described fluorination procedures.

It is an object of the present invention to provide a process for recovering the valuable components from reaction mixtures obtained by fluorinating perchloro-ethylene and partially fluorinated products thereof. Another object is to provide a process for separating dichlorotetrafluoroethane from the reaction mixtures obtained by fluorinating $CCl_2CCl_2$ and partially fluorinated products thereof. A further object is to provide a process for recovering HCl in a usable form from the reaction mixtures obtained by fluorinating $CCl_2CCl_2$ and partially fluorinated products thereof. Other objects are to advance the art. Still other objects will appear hereinafter.

The above and other objects may be accomplished in accordance with my invention which comprises subjecting a reaction mixture, consisting substantially wholly of HCl, HF and one or more of $C_2Cl_2F_4$, $C_2Cl_3F_3$, and $C_2Cl_4F_2$, to anhydrous fractional distillation under pressures of from about 40 to about 350 pounds per square inch gauge and at temperatures of from about $-63°$ C. to about $5°$ C. adjusted to the pressures to distill off substantially pure anhydrous HCl while retaining the rest of the mixture in the still. The mixture, remaining in the still, preferably, is caused to settle until it forms a layer of organic products containing a small proportion of dissolved HF and a layer of substantially anhydrous HF containing a minor proportion of dissolved organic products which layers are separated. The separated layer of organic products, where it is a mixture which requires further separation, is subjected to a further anhydrous fractional distillation under pressures and at temperatures adjusted to the pressures to distill off the more volatile organic product, HF and any unreacted $Cl_2$ from the rest of the mixture. The separated organic product may then be passed to a scrubber where it is washed first with water and then with caustic soda solution to remove $Cl_2$ and HF. The undistilled portion of the reaction mixture, comprising one or more less highly fluorinated products and traces of HF, and the separated HF layer may then be recycled for further reaction. Alternatively, the undistilled portion of the reaction mixture, if it comprises a mixture of organic products, may be subjected to an anhydrous fractional distillation to recover the more volatile organic product, if desired.

I have found that, by such process, I am able to effectively separate the reaction mixtures into their valuable components in an easy and economical manner and to largely overcome the objections of the method previously employed. Only relatively small amounts of material are subjected to the washing, drying and condensing steps, whereby large economies are effected in the process and in the apparatus employed. Furthermore, the HCl and the HF are separately recovered in a commercially valuable and usable form, the HF for recycling. There is also substantially complete recovery of the other products since substantially none is lost by solution in the scrubbing water. It will thus be apparent that by my process, I am able to effectively recover the valuable components of the reaction mixtures in a simple and easy manner and to effect large economies in the process and in the apparatus.

In order to more clearly illustrate my invention and the best modes of carrying the same into effect, my invention will be described in more detail with reference to the accompanying drawings which illustrate types of apparatus, shown somewhat diagrammatically, which may be employed for carrying out my invention.

The apparatus shown in Fig. 1 of the drawings comprises a reaction vessel 10, a reflux column 12, a dephlegmator 14, a catch tank 16, a reflux column 20 and a dephlegmator 22, all connected in series by suitable conduits. A still pot 18 is connected to the bottom of the reflux column 20. The still pot 18 is connected to a settling tank 24 through a suitable conduit. There is also provided a reflux column 28, a dephlegmator 30 and a still pot 32 connected by suitable conduits. A conduit leads from the tank 24 to the reflux column 28. The still pot 32 is provided with a conduit for withdrawing still residues therefrom and recycling them to the reaction vessel 10. The settling tank 24 is provided with a member 26 for indicating the level of interface between the two layers. A conduit is provided for withdrawing the HF layer from the settling tank 24 and recycling it to the reaction vessel 10.

In operation, $CCl_2CCl_2$, $Cl_2$ and HF are passed to the reaction vessel 10, containing a fluorination catalyst, wherein the $CCl_2CCl_2$ is fluorinated to produce $C_2Cl_2F_4$ and other products. A suitable catalyst may be prepared by placing about 830 parts of $SbCl_5$ and about 250 parts of $SbCl_3$ in the reaction vessel and then passing HF through the mixture until the fluorine content therein is about 14% to about 17%. The reaction mixture is passed from the reaction vessel through the reflux column 12 and dephlegmator 14, operated to retain under-fluorinated products for maximum conversion to $C_2Cl_2F_4$. The reaction products then pass to the catch tank 16 wherein they are freed from entrained catalyst, such as antimony salts, which is returned to the reaction vessel. The gaseous reaction mixture is compressed into the middle of the reflux column 20, employing a pump or compressor where necessary. The mixture entering the reflux column 20 is partially liquid and partially gaseous or wholly gaseous, depending on the pressure and temperature.

The reflux column 20 and the dephlegmator 22 are operated at temperatures, corresponding to the pressure employed, to distill off substantially pure anhydrous HCl which is taken off at the top. With pressures of about 100 pounds per square inch gauge, the dephlegmator temperature will be from about $-40°$ C. to about $-50°$ C. I have found these last temperatures and pressures to be the most practical, but higher or lower pressures may be used with the temperatures adjusted accordingly. The still pot 18 will be heated to give a pot temperature of about $40°$ C. to about $70°$ C.

The other components of the reaction mixture will pass to and be collected in the still pot 18. The residue in the still pot will be passed to the settling tank 24. Upon settling, there is formed a layer of substantially anhydrous HF containing a minor proportion of dissolved organic products, and a layer of organic products containing a small proportion of dissolved HF. The organic products are soluble in HF in varying proportions depending upon the temperatures, being soluble in the proportion of about 17% by weight but less than 20% at $25°$ C. and less soluble at lower temperatures. The HF is also soluble in the organic products in proportions depending upon the temperatures, being soluble in $C_2Cl_3F_3$ in the proportion of about 0.2% by weight at temperatures of from −25° C. to +25° C. and soluble in $C_2Cl_2F_4$ in the proportion of about 0.5% by weight at 0° C. and about 0.9% at +25° C., so that, ordinarily, the total HF dissolved in the organic layer will not substantially exceed 1% by weight.

The temperature of the separation in settling tank 24 will usually be such as to develop pressures sufficient to force the organic layer into reflux column 28 and hence will be dependent upon the pressure at which such column is being operated. Generally, these temperatures will be from about 20° C. to about 50° C. The temperature of the layer separation may be lower, as low as is convenient such as −20° C. in order to minimize loss of HF by solution in the organic layer. If such temperature is insufficient to develop pressures to force the organic layer into column 28, then a pump may be used to withdraw the organic layer from tank 24 and force it into column 28.

The organic layer will be withdrawn from tank 24 and passed into the reflux column 28. The reflux column 28 will normally operate at lower pressures than the reflux column 20, e. g., at from about 0 to about 80 pounds per square inch gauge. If desired, a compressor or other means can be included to provide the pressure in the reflux column 28. Preferably, the pressure in the reflux column 28 and the dephlegmator 30 will be about 40 pounds per square inch gauge. At these pressures, the temperature in the dephlegmator will be from about 39° C. to about 44° C. By this means, there is obtained a substantially complete separation of the $C_2Cl_2F_4$, HF and $Cl_2$ from the rest of the reaction mixture. The mixture of $C_2Cl_2F_4$, HF and $Cl_2$ will be passed directly to a scrubber wherein the HF and $Cl_2$ can be removed from the $C_2Cl_2F_4$ by washing with water and then with caustic soda solution.

The HF layer is withdrawn from the settling tank 24 and passed to the reaction vessel 10 or to storage. The solution of the organic products in the HF is unobjectionable because the $C_2Cl_2F_4$ will not be further fluorinated and the other products will, at least in part, be further fluorinated to the more valuable $C_2Cl_2F_4$. The HF layer contains most of the HF from the reaction mixture and hence the separation and recycling of the HF layer results in a large saving of HF.

The residue in the still pot 32 comprises $C_2Cl_3F_3$ and $C_2Cl_4F_2$ which, preferably, will be returned to the reaction vessel 10 for further fluorination, but which may be readily separated by an anhydrous fractional distillation.

The residues in the still pots 18 and 32 will preferably be allowed to build up until the pots are about half full and the residues will be drawn off therefrom as necessary to maintain the pots about half full. If all of the still residue were removed from each pot, the stills would tend to operate erratically. By maintaining each still pot about half full of residues, smoother and better still performance is obtained.

In order to more clearly illustrate my invention, the following example is given:

Example I

A mixture, consisting substantially of 830 parts of $SbCl_5$ and 250 parts of $SbCl_3$, is placed in the reactor 10. Hydrogen fluoride is then introduced into the reactor at a rate of about 50 parts/hour until the fluorine content is about 14–17%. The temperature of the reactor is raised to about 160–180° C. and hydrogen fluoride, chlorine, and perchloro-ethylene then added at the following rates:

| | Parts/Hour |
|---|---|
| HF | 50 |
| $C_2Cl_4$ | 59–60 |
| $Cl_2$ | 25 |

At an operating pressure of about 125–150 p. s. i. g., the effluent gases (containing 44 mole per cent of HCl, 6 mole per cent $C_2Cl_2F_4$, 6 mole per cent $C_2Cl_3F_3$, 44 mole per cent HF and smaller amounts of other components) coming from the catalyst vessel were freed of antimony salts and compressed by autogenous pressure into the central section of the HCl still column. This partially liquid and partially vaporized mixture is then continuously fractionated to remove HCl through dephlegmator 22. The dephlegmator of this HCl distillation unit is maintained under pressure-temperature conditions which reflux anhydrous HCl. These conditions correspond closely to 100 p. s. i. g. at a temperature of about −40° C. to −50° C. The HCl still pot 18 is heated to give a pot temperature of about 40° C. to 70° C. The operation may be modified to distill off the excess chlorine in the HCl still. The reaction products, remaining in the bottom of the HCl still, consist substantially of $C_2Cl_2F_4$, $C_2Cl_3F_3$, $C_2Cl_4F_2$ and HF. A standpipe in the pot connects it with the HF-organic separator 24. The controls are so arranged that when pot 18 becomes half full, the valve in the line to the separator 24 is opened and the residue forced by pressure into the separator. This valve may be so controlled as to be continuously throttled. The HF layer (top) is then removed from the separator and recycled into reactor 10. The organic layer is forced through a standpipe (similar to that in still pot 18) to the mid-section of the $C_2Cl_2F_4$ column 28 which is operated at a pressure of about 35–60 p. s. i. g. The $C_2Cl_2F_4$ column is operated to maintain the temperature and pressure in the dephlegmator equivalent to the saturation values for $C_2Cl_2F_4$. In this case, this is a pressure of 40 p. s. i. g. at a temperature of 44° C. From the $C_2Cl_2F_4$ dephlegmator 30, the desired fluorinated compound, $C_2Cl_2F_4$, together with small proportions of HF and $Cl_2$, is sent to the scrubbers. The under-fluorinated compounds, $C_2Cl_3F_3$, $C_2Cl_4F_2$, with traces of HF, collecting in still pot 32 are continuously recycled to reactor 10.

Figure 2:
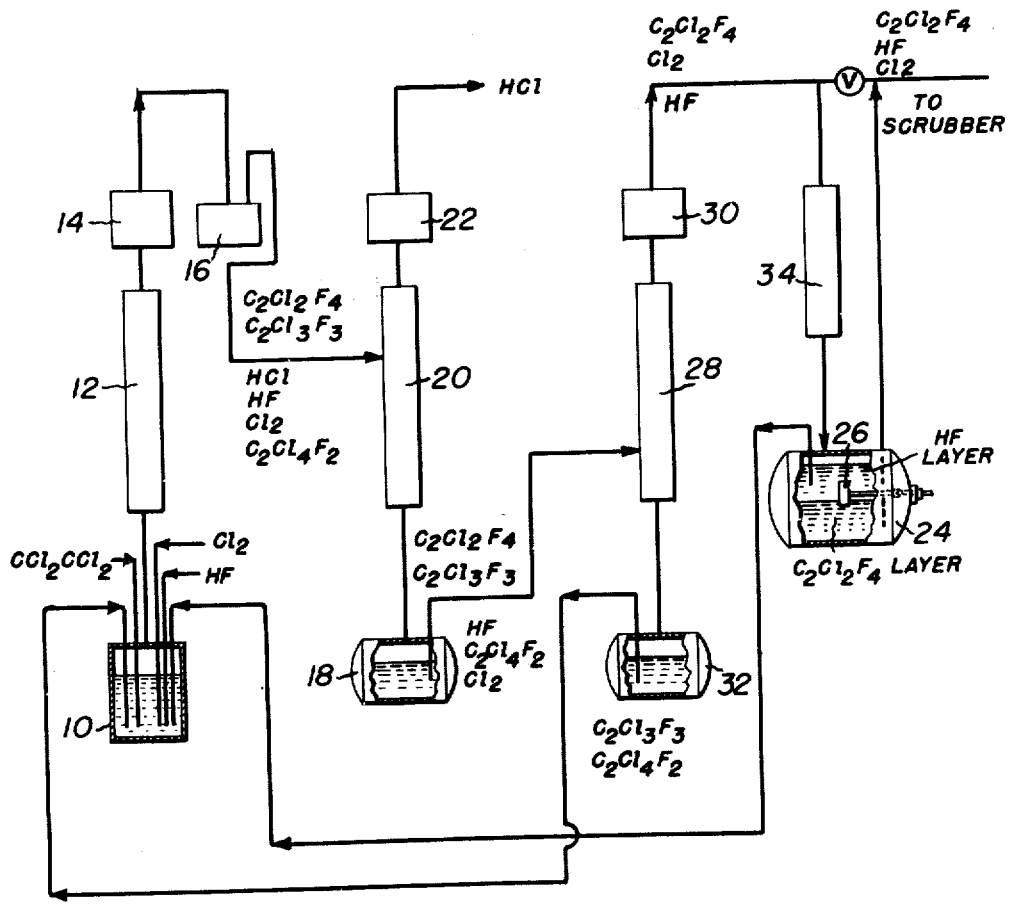

While it is preferred to carry out the layer separation of the HF from the organic products before passing them to reflux column 28, the process may be modified as shown in Fig. 2. In this modification, the entire still residue from still pot 18 is passed to reflux column 28 where the $C_2Cl_2F_4$ and HF will be distilled off together as an azeotrope. If an excess of unreacted HF appears in the reaction mixture, it will pass to still pot 32 and then be recycled to the reaction vessel with the $C_2Cl_3F_3$ and $C_2Cl_4F_2$. The mixture $C_2Cl_2F_4$ and HF will then be passed to a condenser 34 where it will be condensed and then passed to a separator 24 and settled to form a layer of anhydrous hydrogen fluoride containing dissolved $C_2Cl_2F_4$ and a layer of $C_2Cl_2F_4$ containing dissolved HF, which layers can be readily separated, the proportions of dissolved products corresponding to those in the separation of Fig. 1 under similar conditions. In this modification, temperatures as low as 10° C. in the settling tank 24 will usually develop sufficient pressure to force the organic layer to the scrubber where the scrubber is operating at pressures of 0 to 5 pounds per square inch gauge, whereby the proportions of dissolved products in the layers will be reduced.

When my process is so modified as in Fig. 2, the pressures in the reflux column 28 and dephlegmator 30 will be in the range heretofore disclosed, that is, from about 0 to about 80 pounds per square inch gauge and temperatures up to about 50° C., preferably, at pressures of about 40 to 50 pounds per square inch gauge and a temperature of about 25° C., adjusted in accordance with the boiling points of the mixtures to be distilled off. For example, a 1:1 mixture of $C_2Cl_2F_4$ and HF will boil about 14.5° C. lower than pure $C_2Cl_2F_4$ at 52 pounds per square inch gauge and about 15.5° C. lower at 78 pounds per square inch gauge.

When the fluorination procedure is modified so that the gases, from the dephlegmator 14, contain mixtures of two or more of $CCl_2F-CClF_2$, $CCl_2F-CCl_2F$ and $C_2Cl_5F$, with not more than traces of $CClF_2-CClF_2$, and it is desired to separate out and recover one of such compounds, the temperatures and pressures in column 28 and dephlegmator 30 will be adjusted to distill off the more highly fluorinated compound (the more volatile) while collecting the less highly fluorinated compound in the still pot 32.

Figure 3:
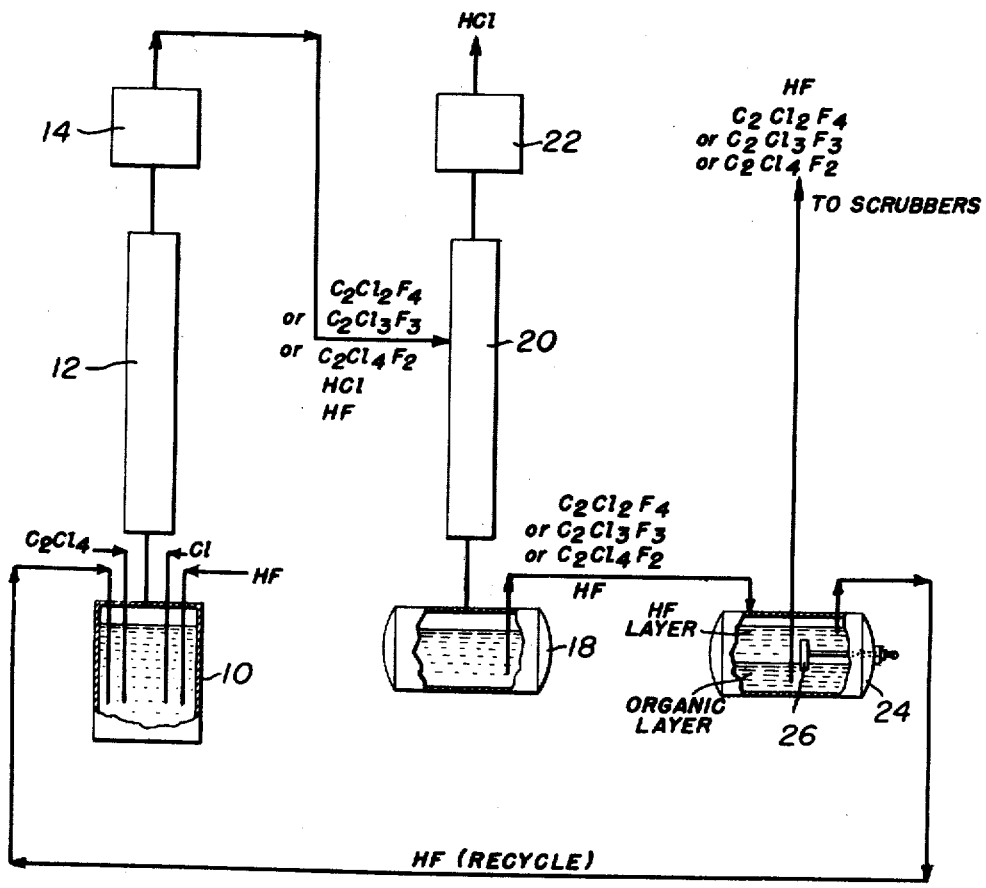

When the fluorination procedure is modified so that the gases from the dephegmator 14 contain substantially only one of $CClF_2-CClF_2$, $CCl_2F-CClF_2$, and $CCl_2F-CCl_2F$, with not more than about 1% of other fluorinated organic compounds, and it is unnecessary or undesirable to separate the organic compounds from each other, the column 28, dephlegmator 30 and still pot 32 will be eliminated as in Fig. 3. Also, certain mixtures of the fluorinated organic products are useful for some purposes and, when the fluorination procedure is so regulated as to produce such mixtures, the column 28, dephlegmator 30 and still pot 32 may be eliminated. Under these circumstances, it is unnecessary to maintain any particular pressures and temperatures in the separator 24, and such pressures and temperatures may be varied as desired so long as the materials therein are maintained in the liquid state. Also, when the organic in the gases from the dephlegmator 14 consists substantially of the higher fluorinated compounds, obtained at high reactor pressures, the pressures and temperatures in column 20 and dephlegmator 22 may be higher, e. g., 250 to 350 p. s. i. g. and —15° C. to +5° C., with higher temperatures in still pot 18, e. g., 80° C. to 115° C.

Such modifications, employing the arrangement of Fig. 3, except where specifically indicated otherwise, are illustrated in the following examples:

*Example II*

Approximately 1000 parts of $SbCl_5$ are placed in a reactor 10 and the temperature raised to 100° C. to 140° C. Hydrogen fluoride is then introduced into the reactor at a rate of about 50 parts/hour, until the fluorine content is 2% to 6%, and then approximately 300 parts of $C_2Cl_4$ and 130 parts of $Cl_2$ are added over a 2 hour period. Hydrogen fluoride, chlorine, and perchloro-ethylene are then added at the following rates:

| | Parts/Hour |
|---|---|
| HF | 40 |
| $C_2Cl_4$ | 120 |
| $Cl_2$ | 51.3 |

The unit is operated at 10 to 25 p. s. i. g. with enough cooling on the dephlegmator 14 to reflux $CCl_2F-CCl_2F$ in the upper portion of the column 12, thus holding back any under-fluorinated products. The column 12 is also operated so as to reflux $C_2Cl_5F$ in the lower section, thus minimizing the concentration of $CCl_2F-CCl_2F$ in the reactor 10 and consequent production of $CCl_2F-CClF_2$. Approximately 300 parts of organic are kept in the reactor 10 at all times.

The effluent gases (containing about 54 mol per cent HCl, 19 mol per cent HF, 26.5 mol per cent $CCl_2F-CCl_2F$ and 0.5 mol per cent $CCl_2F-CClF_2$), coming from the dephlegmator 14, are forced into the lower section of the HCl distillation column 20. This mixture is then continuously fractionated to remove HCl through the dephlegmator 22 which is maintained under temperature-pressure conditions to reflux anhydrous HCl. These conditions correspond to 100 p. s. i. g. at a temperature of about —40° C. to —50° C. The HCl still pot 18 is heated to a temperature of 85±15° C. The $CCl_2F-CClF_2$, which concentrates in the lower part of the HCl column 20, serves to prevent freezing of the higher boiling $CCl_2F-CCl_2F$ by protecting the latter from the low temperatures in the upper part of the column 20. The reaction products, in the HCl still pot 18, consist substantially of $CCl_2F-CCl_2F$ and HF, together with the equilibrium amount of $CCl_2F-CClF_2$, and are fed under autogenous pressure to the HF-organic separator 24. The controls are so arranged that, when the pot 18 becomes half full, the valve in the line to the separator 24 is opened and the residue forced into this separator. The valve may be so controlled as to be continuously throttled. The HF layer (top) is then removed from the separator and recycled into the reactor 10. If the $CCl_2F-CClF_2$ in the organic is not objectionable, the latter is fed directly to scrubbers for removal of dissolved acidic impurities. If it is desired to remove the $CCl_2F-CClF_2$, the scrubbing step may be preceded by distillation as in Fig. 1.

*Example III*

Approximately 1000 parts of $SbCl_5$ are placed in a reactor 10 and the temperature raised to 120° C. to 140° C. Hydrogen fluoride is then introduced into the reactor at a rate of about 50 parts/hour until the fluorine content is 2% to 6%, and then approximately 300 parts of $C_2Cl_4$ and 130 parts of $Cl_2$ are added over a period of 2 hours. Hydrogen fluoride, chlorine, and perchloro-ethylene are then added at the following rates:

| | Parts/Hour |
|---|---|
| HF | 80 |
| $C_2Cl_4$ | 165 |
| $Cl_2$ | 70.6 |

The unit is operated at 60 to 120 p. s. i. g. with enough cooling on the dephlegmator 14 to reflux $CCl_2F-CClF_2$ in the upper portion of the column 12, thus holding back any under-fluorinated products. The column 12 is also operated so as to reflux $CCl_2F-CCl_2F$ in the lower section, thus minimizing the concentration of $CCl_2F-CClF_2$ in the catalyst pot 10 and consequent production of $CClF_2-CClF_2$. Approximately 300 parts of organic are kept in the reactor 10 at all times.

The effluent gases (containing about 60 mol per cent HCl, 20 mol per cent HF and 20 mol per cent $CCl_2F-CClF_2$), coming from the dephlegmator 14, are forced into the central section of the HCl distillation column 20. This mixture is then continuously fractionated to remove HCl through the dephlegmator 22, which is maintained under temperature-pressure conditions to reflux anhydrous HCl. These conditions correspond to 100 p. s. i. g. at a temperature of about —40° C. to —50° C. The HCl still pot 18 is heated to a temperature of 75±15° C. The reaction products in the HCl still pot 18 consist substantially of $CCl_2F-CClF_2$ and HF, and are fed under autogenous pressure to the HF-organic separator 24. The controls are so arranged that, when the pot 18 becomes half full, the valve in the line to the separator 24 is opened and the residue forced into this separator. The valve may be so controlled as to be continuously throttled. The HF layer (top) is then removed from the separator and recycled into the reactor 10, while the organic is fed to scrubbers for removal of dissolved acidic impurities.

*Example IV*

Approximately 1000 parts of $SbCl_5$ are placed in a reactor 10 and the temperature raised to 150° C. to 170° C. Hydrogen fluoride is then introduced into the reactor at a rate of about 50 parts/hour until the fluorine content is 15% to 20%, and then approximately 300 parts of $C_2Cl_4$ and 130 parts of $Cl_2$ are added over a period of 2 hours. Hydrogen fluoride, chlorine, and perchloro-ethylene are then added at the following rates:

|  | Parts/Hour |
|---|---|
| HF | 120 |
| $C_2Cl_4$ | 160 |
| $Cl_2$ | 68.4 |

The unit is operated at 350 to 450 p. s. i. g. with enough cooling on the dephlegmator 14 to reflux $CClF_2-CClF_2$ in the upper portion of the column 12, thus holding back any under-fluorinated products. The column 12 is also operated so as to reflux $CCl_2F-CClF_2$ in the lower section, thus minimizing the concentration of $CClF_2-CClF_2$ in the catalyst pot 10 and consequent production of $C_2ClF_5$. Approximately 300 parts of organic are kept in the reactor 10 at all times.

The effluent gases (containing about 56 mol per cent HCl, 30 mol per cent HF, and 14 mol per cent $CClF_2-CClF_2$) coming from the dephlegmator 14 are fed under autogenous pressure into the central section of the HCl distillation column 20. This mixture is then continuously fractionated to remove HCl through the dephlegmator 22, which is maintained under temperature-pressure conditions to reflux anhydrous HCl. These conditions correspond to 100 p. s. i. g. at a temperature of about —40° C. to —50° C. The HCl still pot 18 is heated to a temperature of 50±15° C. The reaction products in the HCl still pot 18 consist substantially of $CClF_2-CClF_2$ and HF, and are fed under autogenous pressure to the HF-organic separator 24. The controls are so arranged that, when the pot 18 becomes half full, the valve in the line to the separator 24 is opened and the residue forced into this separator. The valve may be so controlled as to be continuously throttled. The HF layer (top) is then removed from the separator and recycled into the reactor 10, while the organic is fed to scrubbers for removal of dissolved acidic impurities.

*Example V*

Approximately 1000 parts of $SbCl_5$ are placed in a reactor 10 and the temperature raised to 150° C. to 170° C. Hydrogen fluoride is then introduced into the reactor at a rate of about 50 parts/hour until the fluorine content is 15 to 20%, and then approximately 300 parts of $C_2Cl_4$ and 130 parts of $Cl_2$ are added over a period of 2 hours. Hydrogen fluoride, chlorine, and perchloro-ethylene are then added at the following rates:

|  | Parts/Hour |
|---|---|
| HF | 120 |
| $C_2Cl_4$ | 160 |
| $Cl_2$ | 68.4 |

The unit is operated at 350 to 450 p. s. i. g. with enough cooling on the dephlegmator 14 to reflux $CClF_2-CClF_2$ in the upper portion of the column 12, thus holding back any under-fluorinated products. The column 12 is also operated so as to reflux $CCl_2-CClF_2$ in the lower section, thus minimizing the concentration of $CClF_2-CClF_2$ in the catalyst pot 10 and consequent production of $C_2ClF_5$. Approximately 300 parts of organic are kept in the reactor 10 at all times.

The effluent gases (containing about 56 mol per cent HCl, 30 mol per cent HF, and 14 mol per cent $CClF_2-CClF_2$) coming from the dephlegmator 14 are fed under pressure into the central section of the HCl distillation column 20. This mixture is then continuously fractionated to remove HCl through the dephlegmator 22, which is maintained under temperature-pressure conditions to reflux anhydrous HCl. These conditions correspond to 350 p. s. i. g. at a temperature of +5° C. to —5° C. The HCl still pot 18 is heated to a temperature of 85° C. to 115° C. The reaction products in the HCl still pot 18 consist substantially of $CClF_2-CClF_2$ and HF, and are fed under autogenous pressure to the HF-organic separator 24. The controls are so arranged that, when the still pot 18 becomes half full, the valve in the line to the separator 24 is opened and the residue forced into this separator. The valve may be so controlled as to be continuously throttled. The HF layer (top) is then removed from the separator and recycled into the reactor 10, while the organic is fed to scrubbers for removal of dissolved acidic impurities.

*Example VI*

Approximately 1000 parts of $SbCl_5$ are placed in the reactor 10 and the temperature raised to 150° C. to 170° C. Hydrogen fluoride is then introduced into the reactor at a rate of about 50 parts/hour until the fluorine content is 15 to 20%, and then approximately 300 parts of $CCl_2F-CClF_2$ are added at a rate of 150 parts/hour. Hydrogen fluoride and $CCl_2F-CClF_2$ are then added at the following rates:

|  | Parts/Hour |
|---|---|
| HF | 50 |
| $CCl_2F-CClF_2$ | 300 |

The unit is operated at 300 to 350 p. s. i. g. with enough cooling on the dephlegmator to reflux $CClF_2-CClF_2$ in the upper portion of the column 12, thus holding back any unreacted $CCl_2F-CClF_2$. The column 12 is also operated so as to reflux $CCl_2F-CClF_2$ in the lower section; thus minimizing the concentration of $CClF_2-CClF_2$ in the catalyst pot 10 and consequent production of $C_2ClF_5$. Approximately 300 parts of organic are kept in reactor 10 at all times.

The effluent gases (containing about 40 mol per cent HCl, 20 mol per cent HF, and 40 mol per cent CClF$_2$-CClF$_2$) coming from the dephlegmator 14 are fed under autogenous pressure into the central section of the HCl distillation column 20. This mixture is then continuously fractionated to remove HCl through the dephlegmator 22, which is maintained under temperature-pressure conditions to reflux anhydrous HCl. These conditions correspond to 100 p. s. i. g. at a temperature of —40° C. to —50° C. The HCl still pot 18 is heated to a temperature of 50±15° C. The reaction products in the HCl still pot 18 consist substantially of CClF$_2$-CClF$_2$ and HF, and are fed under autogenous pressure to the HF-organic separator 24. The controls are so arranged that, when the pot 18 becomes half full, the valve in the line to the separator 24 is opened and the residue forced into this separator. The valve may be so controlled as to be continuously throttled. The HF layer (top) is then removed from the separator and recycled into the reactor 10, while the organic is fed to scrubbers for removal of dissolved acidic impurities.

The apparatus and the operation thereof, as hereinbefore described, illustrate preferred types of apparatus for a continuous process. Other types of apparatus may be substituted therefor. Also, the process may be operated batchwise in suitable apparatus therefor. Furthermore, pressures, higher and lower than those disclosed, may be employed with suitable adjustment of the temperatures in accordance with the principles of my invention. Therefore, my invention is not to be limited to the specific embodiments disclosed, but I intend to cover my invention broadly as in the appended claims.

This is a continuation-in-part of my copending application Serial No. 709,880 filed November 14, 1946, which was a continuation-in-part of application Serial No. 577,870 filed February 14, 1945, copending therewith but since abandoned.

I claim:
1. The process of separating valuable components from a reaction mixture consisting substantially wholly of HCl, HF and at least one chlorofluoroethane of the group consisting of C$_2$Cl$_2$F$_4$, C$_2$Cl$_3$F$_3$, and C$_2$Cl$_4$F$_2$, which comprises the steps of subjecting the reaction mixture to anhydrous fractional distillation under pressures of from about 40 to about 350 pounds per square inch gauge and at temperatures of from about —63° C. to about 5° C., adjusted to the pressures to distill off the HCl as substantially pure anhydrous hydrogen chloride, settling the remaining mixture until it forms a layer of substantially anhydrous hydrogen fluoride containing a minor proportion of dissolved organic products and a layer of organic products containing a small proportion of dissolved HF and then separating the layers.

2. The process of separating valuable components from a reaction mixture consisting substantially wholly of HCl, HF and at least one chlorofluoroethane of the group consisting of C$_2$Cl$_2$F$_4$, C$_2$Cl$_3$F$_3$, and C$_2$Cl$_4$F$_2$, which comprises the steps of subjecting the reaction mixture to anhydrous fractional distillation under pressures of from about 40 to about 200 pounds per square inch gauge and at temperatures of from about —63° C. to about —20° C., adjusted to the pressures to distill off the HCl as substantially pure anhydrous hydrogen chloride, settling the remaining mixture until it forms a layer of substantially anhydrous hydrogen fluoride containing a minor proportion of dissolved organic products and a layer of organic products containing a small proportion of dissolved HF and then separating the layers.

3. The process of separating valuable components from a reaction mixture consisting substantially wholly of HCl, HF and at least one chlorofluoroethane of the group consisting of C$_2$Cl$_2$F$_4$, C$_2$Cl$_3$F$_3$, and C$_2$Cl$_4$F$_2$, which comprises the steps of subjecting the reaction mixture to anhydrous fractional distillation under pressures of about 100 pounds per square inch gauge and at about —50° C. to about —40° C. to distill off the HCl as substantially pure anhydrous hydrogen chloride, settling the remaining mixture until it forms a layer of substantially anhydrous hydrogen fluoride containing a minor proportion of dissolved organic products and a layer of organic products containing a small proportion of dissolved HF and then separating the layers.

4. The process of separating valuable components from a reaction mixture comprising HCl, HF, C$_2$Cl$_2$F$_4$, C$_2$Cl$_3$F$_3$ and C$_2$Cl$_4$F$_2$, of the character of that obtained by the reaction of HF and Cl$_2$ on CCl$_2$CCl$_2$, which comprises the steps of subjecting the reaction mixture to anhydrous fractional distillation under pressures of from about 40 to about 200 pounds per square inch gauge and at temperatures of from about —63° C. to about —20° C., adjusted to the pressures to distill off the HCl as substantially pure anhydrous hydrogen chloride, settling the remaining mixture until it forms a layer of substantially anhydrous hydrogen fluoride containing a minor proportion of dissolved organic products and a layer of organic products containing a small proportion of dissolved HF, separating the layers, and then subjecting the separated organic layer to a further anhydrous fractional distillation under pressures of from about 0 to about 80 pounds per square inch gauge and at temperatures of from about 0° C. to about 65° C., adjusted to the pressures to distill off the dichlorotetrafluoroethane and dissolved HF.

5. The process of separating valuable components from a reaction mixture comprising HCl, HF, C$_2$Cl$_2$F$_4$, C$_2$Cl$_3$F$_3$ and C$_2$Cl$_4$F$_2$, of the character of that obtained by the reaction of HF and Cl$_2$ on CCl$_2$CCl$_2$, which comprises the steps of subjecting the reaction mixture to anhydrous fractional distillation under pressures of about 100 pounds per square inch gauge and at about —50° C. to about —40° C. to distill off the HCl as substantially pure anhydrous hydrogen chloride, settling the remaining mixture until it forms a layer of substantially anhydrous hydrogen fluoride containing a minor proportion of dissolved organic products and a layer of organic products containing a small proportion of dissolved HF, separating the layers, and then subjecting the separated organic layer to a further anhydrous fractional distillation under pressures of about 40 pounds per square inch gauge and at temperatures of from about 39° C. to about 44° C. to distill off the dichlorotetrafluoroethane and dissolved HF.

6. The process of separating valuable components from a reaction mixture comprising HCl, HF, C$_2$Cl$_2$F$_4$, C$_2$Cl$_3$F$_3$ and C$_2$Cl$_4$F$_2$, of the character of that obtained by the reaction of HF and Cl$_2$ on CCl$_2$CCl$_2$, which comprises the steps of subjecting the reaction mixture to anhydrous fractional distillation under pressures of from about 40 to about 200 pounds per square inch gauge and at temperatures of from about —63° C. to about —20° C., adjusted to the pressures to distill off the HCl as substantially pure anhydrous hydrogen chloride, then subjecting the remaining mixture to a further anhydrous fractional distillation under pressures of from about 0 to about 80 pounds per square inch gauge and at temperatures up to about 50° C., adjusted to the pressures to distill off a mixture comprising substantially the dichlorotetrafluoroethane and HF, condensing the distillate mixture, settling the condensed mixture until it forms a layer of substantially anhydrous hydrogen fluoride containing a minor proportion of dissolved organic products and a layer of dichlorotetrafluoroethane containing a small proportion of dissolved HF, and separating the layers.

ANTHONY F. BENNING.

REFERENCES CITED

The following references are of record in the file of this patent:

UNITED STATES PATENTS

| Number | Name | Date |
| --- | --- | --- |
| 1,442,838 | Curme | July 18, 1922 |
| 1,994,035 | Coco | Mar. 12, 1935 |
| 2,005,710 | Daudt et al. | June 18, 1935 |
| 2,322,800 | Frey | June 29, 1943 |
| 2,364,583 | De Simo | Dec. 5, 1944 |
| 2,450,414 | Benning | Oct. 5, 1948 |
| 2,450,415 | Benning | Oct. 5, 1948 |